United States Patent [19]

Adachi

[11] Patent Number: 4,952,807

[45] Date of Patent: Aug. 28, 1990

[54] METHOD OF ADJUSTING RADIATION IMAGE READ-OUT CONDITIONS AND IMAGE PROCESSING CONDITIONS

[75] Inventor: Yuuma Adachi, Kanagawa, Japan

[73] Assignee: Fuji Photo Film Co., Ltd., Kanagawa, Japan

[21] Appl. No.: 299,151

[22] Filed: Jan. 19, 1989

Related U.S. Application Data

[63] Continuation-in-part of Ser. No. 76,815, Jul. 23, 1987, abandoned, and a continuation-in-part of Ser. No. 195,381, May 10, 1988, abandoned, which is a continuation of Ser. No. 821,939, Jan. 24, 1986, abandoned.

[30] Foreign Application Priority Data

Jan. 24, 1985 [JP] Japan .................. 60-11397
Jul. 23, 1986 [JP] Japan .................. 61-173271

[51] Int. Cl.$^5$ ............................. G01N 23/04
[52] U.S. Cl. ..................... 250/327.2; 250/484.1
[58] Field of Search .............. 250/327.2 C, 327.2 G, 250/484.1 B; 364/413.13, 413.26; 382/22, 19, 48; 358/284, 283, 282

[56] References Cited

U.S. PATENT DOCUMENTS

| | | | |
|---|---|---|---|
| 3,576,980 | 5/1971 | Doyle | 382/22 |
| 3,585,592 | 6/1971 | Kiji | 382/22 |
| 4,284,889 | 8/1981 | Kato et al. | 250/327.2 |
| 4,310,886 | 1/1982 | Kato et al. | 364/414 |
| 4,334,274 | 6/1982 | Agui et al. | 382/22 |
| 4,498,006 | 2/1985 | Horikawa et al. | 250/484.1 B |

FOREIGN PATENT DOCUMENTS 0016694 10/1980 European Pat. Off. ............ 358/283
0013554 1/1980 Japan ............................. 358/283

*Primary Examiner*—Janice A. Howell
*Assistant Examiner*—Richard Hanig
*Attorney, Agent, or Firm*—Sughrue, Mion, Zinn, Macpeak & Seas

[57] ABSTRACT

In a method of adjusting read-out conditions for final read-out of a radiation image or for adjusting image processing conditions of a radiation image stored in a stimulable phosphor sheet by limiting the irradiation field. In adjusting read-out conditions for final read-out, image information obtained by preliminary read-out is subjected to a threshold value processing to detect a background portion inside of the irradiation field. The image information inside of the irradiation field constituted by the background portion and an object image portion surrounded by the background portion is selected from the image information obtained by the preliminary read-out. The read-out conditions in the final read-out adjusted on the basis of the selected image information. In adjusting image processing conditions, image information obtained by exposing the stimulable phosphor sheet to emit light in proportion to the stored radiation and photoelectrically detecting the emitted light is subjected to a threshold value processing to detect a background portion inside of the irradiation field. The image information inside of the irradiation field constituted by the background portion and an object portion surrounded by the backgroud portion is selected from the obtained image information. The image processing conditions for use in an image processing of the radiation image information are adjusted on the basis of the selected image information.

10 Claims, 3 Drawing Sheets

ID OF ADJUSTING RADIATION IMAGE
READ-OUT CONDITIONS AND IMAGE
PROCESSING CONDITIONS

The present application is a Continuation-In-Part application of U.S. Ser. No. 07/076,815 filed July 23, 1987, and is a Continuation-In-Part of U.S. Ser. No. 07/195,381 filed on May 10 1988, which is a Continuation of U.S. Ser. No. 06/821,939 filed on Jan. 24, 1986.

FIELD OF THE INVENTION

This invention relates to a method of adjusting radiation image read-out conditions or image processing conditions in a radiation image recording and reproducing system using a stimulable phosphor sheet.

BACKGROUND OF THE INVENTION

When certain kinds of phosphors are exposed to a radiation such as X-rays, $\alpha$-rays, $\beta$-rays, gamma-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object such as the human body, to have a radiation image of the objected stored therein, and is then scanned or exposed with stimulating rays such as a laser beam which cause it to emit light in the pattern of the stored image (i.e., in proportion to the stored radiation energy). The light emitted by the stimulable phosphor sheet upon stimulation thereof is photoelectrically detected and converted to an electric image signal and the radiation image of the object is reproduced as a visible image by use of the image signals on a recording medium such as a photographic film or on a display device such as a cathode ray tube (CRT) or the like.

One embodiment of the aforesaid radiation image recording and reproducing system is disclosed, for example, in Japanese Unexamined Patent Publication No. 58(1983)-67240. In the disclosed embodiment, before final read-out is conducted by scanning the stimulable phosphor sheet carrying a radiation image of an object stored therein by stimulating rays which cause the stimulable phosphor sheet to emit light in proportion to the radiation energy stored, detecting the emitted light by a photoelectric read-out means and converting it into an electric image signal, preliminary read-out for approximately detecting the image information stored in the stimulable phosphor sheet is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion of the object and/or the image recording method to obtain a visible image suitable for viewing, particularly for diagnostic purposes. The processed image signal is used to reproduce the visible image on a photographic film or the like.

By the term "read-out conditions" as used herein are meant various conditions affecting the relationship between the amount of the light emitted by the stimulable phosphor sheet at the read-out step and the output of the read-out apparatus, for example, the read-out gain (sensitivity) determining the relationship between the input and the output of the read-out apparatus, the scaled factor (latitude), and the power of the stimulating rays used for read-out.

By the term "image processing conditions" as used herein are meant various conditions such as an emphasis coefficient in frequency response processing, and various characteristic values in a gradation processing.

As described above, the level of the stimulating rays used in the preliminary read-out is lower than the level of the stimulating rays used in the final read-out. That is, the effective energy or intensity of the stimulating rays which the stimulable phosphor sheet receives per unit area in the preliminary read-out should be lower than the effective intensity of the stimulating rays used in the final read-out. In order to make the level of the stimulating rays used in the preliminary read-out lower than the level of the stimulating rays in the final read-out the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating rays source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored in the stimulable phosphor sheet is approximately ascertained prior to the final read-out and the final read-out is conducted by use of the read-out conditions adjusted on the basis of the image information, it becomes possible to eliminate adverse effects of fluctuation in the level of the radiation energy stored in the stimulable phosphor sheet, which is caused by a change in the object or the image recording portion thereof, by a fluctuation in the radiation dose, or the like, and to conduct the final read-out by use of desirable read-out conditions.

When the image processing is carried out by use of the image processing conditions adjusted on the basis of the image information stored on the stimulable phosphor sheet, the image processing can be achieved appropriately in accordance with the object and the image recording portion of the object, and a desirable visible image can always be obtained.

As the method of adjusting the read-out conditions in the final read-out on the basis of the image information obtained by the preliminary read-out, or of adjusting the image processing conditions in the image processing conditions in the image information obtained by the image read-out, the applicant proposed in Japanese Patent Application No. 59(1984)-12658 a novel method comprising the steps of: determining a histogram of the amount of light emitted by a stimulable phosphor sheet in preliminary read-out or in image read-out. calculating the maximum light emission amount Smax and the minimum light emission amount Smin of a desired image information range in the histogram, and adjusting the read-out conditions in final read-out or adjusting the image processing conditions in the image processing so that the maximum light emission amount Smax and the minimum light emission amount Smin correspond respectively to the maximum signal level Qmax and the minimum signal level Qmin of a desired input signal range in the image processing means which are determined by the maximum density Dmax and the minimum density Dmin of a correct density range in the reproduced visible image.

On the other hand, in the case where the radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in many cases, the irradiation field should be limited when a radiation image is recorded, Normally, when the irradiation field is limited, radiation scattered by the object within the irradiation field passes outside of the irradiation field. The scattered radiation is absorbed and stored in the stimulable phosphor sheet which exhibits high sensitivity, and therefore the histogram of the light emission amount obtained by the preliminary read-out or light emission amount obtained by image read-out includes the light emission amount caused by the scattered radiation. Since the light emission amount caused by the scattered radiation outside of the irradiation field on the stimulable phosphor sheet is often equal to or larger than the light emission amount within the irradiation field, it is not always possible to discriminate between the light emission amounts inside and outside of the irradiation field in the histogram obtained by the preliminary read-out or obtained by image read-out. As a result, when Smax and Smin are calculated from the histogram as described above and the read-out conditions or the image processing conditions are adjusted on the basis of Smax and Smin, the minimum light emission amount within the irradiation field is not detected as Smin. and that caused by the scattered radiation outside of the irradiation field is detected as Smin. In general, the minimum light emission amount outside of the irradiation field is smaller than that within the irradiation field. Accordingly, when the minimum light emission amount outside of the irradiation field is detected as Smin, signals caused by the scattered radiation not related to diagnosis are taken within a low density range in the final read-out or are considered in the image processing. and the density of the image of the portion related to diagnosis becomes too high. As a result, the image contrast decreases and it becomes difficult to make an accurate diagnosis.

Namely, when a radiation image is recorded by limiting the irradiation field, radiation scattered by the object passes outside of the irradiation field on the stimulable phosphor sheet and causes noise in the image information obtained by the preliminary read-out or obtained by the image read-out. Therefore, when the read-out conditions are adjusted based on such preliminary read-out image, it is not always possible to adjust the read-out conditions to appropriate values and to obtain a visible image suitable for viewing, particularly for diagnostic purposes. Similarly, in the case where the image processing conditions are adjusted based on such image information it is not always possible to adjust the image processing conditions to appropriate values and to obtain a visible image suitable for viewing, particularly for diagnostic purposes.

SUMMARY OF THE INVENTION

An object of the present invention is to provide a method of adjusting radiation image read-out conditions for final read-out to appropriate values on the basis of image information obtained by preliminary read-out, wherein problems caused by irradiation field limitation are eliminated when image recording is conducted by limiting the irradiation field.

Another object of the present invention is to provide a method of adjusting radiation image read-out conditions wherein the range of irradiation field on a stimulable phosphor sheet is detected accurately on the basis of image information obtained by preliminary read-out, whereby the read-out conditions are adjusted to appropriate values.

Another object of the present invention is to provide a method of adjusting radiation image processing conditions to appropriate values on the basis of image information obtained by image read-out, wherein problems caused by limitation of an irradiation field are eliminated in the case where image recording is carried out by limiting the irradiation field.

Another object of the present invention is to provide a method of adjusting radiation image processing conditions wherein the range of the irradiation field on a stimulable phosphor sheet is detected accurately on the basis of image information obtained by image read-out, whereby the image processing conditions are adjusted to appropriate values.

The present invention provides a method of adjusting radiation image read-out conditions in which preliminary read-out conducted by exposing a stimulable phosphor sheet carrying a radiation image of an object stored therein by limitation of an irradiation field to stimulating rays of a level lower than the level of stimulating rays used in final read-out and detecting the radiation image stored in the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of: subjecting said image information obtained by said preliminary read-out to a threshold value processing to detect a background portion inside of the irradiation field, selecting image information inside of the irradiation field constituted by said background portion and an object image portion surrounded by said background portion from said image information obtained by said preliminary read-out. and adjusting said read-out conditions in said final read-out on the basis of said selected image information.

The present invention also provides a method of adjusting radiation image processing conditions in which a stimulable phosphor sheet carrying radiation image information of an object stored thereon by limitation of an irradiation field is exposed to stimulating rays which cause the stimulable phosphor sheet to release the radiation image information as light emission in proportion to the stored radiation energy, the light emitted by the stimulable phosphor sheet is photoelectrically detected to obtain electric image signals for use in reproduction of a visible image, and image processing conditions for use in an image processing carried out for the electric image signals are adjusted.

wherein the improvement comprises the steps of:

(i) subjecting the obtained image information to a threshold value processing to detect a background portion inside of the irradiation field.

(ii) selecting image information inside of the irradiation field constituted by said background portion and an object image portion surrounded by said background portion from said obtained image information, and (iii) adjusting said image processing conditions on the basis of said selected image information.

In the method of adjusting radiation image read-out conditions in accordance with the present invention, the background portion is detected by a threshold value processing of the preliminary read-out image information, and the read-out conditions in the final read-out are adjusted by using only the preliminary read-out image information within the range of the irradiation field comprising the background portion and the object image portion surrounded by the background portion.

Therefore, it is possible to reliably eliminate a scattered radiation component which causes noise. i.e., the preliminary read-out image information in the region outside of the irradiation field, from the image information which is obtained by the preliminary read-out and which is used to adjust the read-out conditions in the final read-out. Accordingly, it becomes possible to eliminate various problems in adjustment of the read-out conditions caused by the scattered radiation component, for example, the problem that the read-out conditions are adjusted so that the visible image at the object image portion is compressed to a high density range and becomes a low-contrast image. Thus, it becomes possible to adjust the read-out conditions in the final read-out to appropriate values.

In the method of adjusting radiation image processing conditions in accordance with the present invention, the background portion is detected by a threshold value processing of the image information, and the image processing conditions are adjusted by using only the image information within the range of the irradiation field comprising the background portion and the object image portion surrounded by the background portion.

Therefore, it is possible to reliably eliminate a scattered radiation component which causes noise. i.e., the image information in the region outside of the irradiation field, from the image information which is obtained by the image read-out and which is used to adjust the image processing conditions. Accordingly, it becomes possible to eliminate various problems in adjustment of the image processing conditions caused by the scattered radiation component, for example, the problem that the image processing conditions are adjusted so that the visible image at the object image portion is compressed to a high density range and becomes a low-contrast image. Thus, it becomes possible to adjust the image processing conditions to appropriate values.

The method of the present invention of adjusting radiation image read-out conditions and of adjusting image processing conditions is applied to the image recording conducted by limiting the irradiation field wherein a background portion outside of an object image portion within the irradiation field on the stimulable phosphor sheet is present. At the background portion, since radiation directly impinges upon the stimulable phosphor sheet without passing through the object, radiation energy of a level higher than the energy level at the other portion is stored. Therefore, the light emission amount detected as the preliminary read-out image information or as image information at the background portion becomes larger than than at the other portion. The present invention was made based on this finding.

When the light emission amount at the background portion is always larger than than at the other portion, it is possible to discriminate the background portion from the other portion, i.e., to detect the position, shape, or the like of the background, by subjecting the preliminary read-out image information (when adjusting read-out conditions) or the image information (when adjusting processing conditions) to a threshold value processing, for example, by converting the preliminary read-out image information or the image information into the two-valued system with a predetermined threshold value. Since the background portion is positioned around the object, the region surrounded by the detected background portion may be recognized as the object image portion. As a result it is possible to detect with high accuracy the irradiation field constituted by the background portion and the object image portion.

In the method of the present invention, adverse effects of the scattered radiation component outside of the irradiation field on the adjustment of the read-out conditions in the final read-out or on the adjustment of the image processing conditions are eliminated by detecting the background portion by a threshold value processing of the preliminary read-out image information or image information. recognizing the irradiation field in an appropriate manner based on the detected background portion, and adjusting the read-out conditions in the final read-out based only on the preliminary read-out image information within the irradiation field or adjusting the image processing conditions based only on the image information Within the irradiation field.

By "threshold value processing" is meant the processing for discriminating between the levels of the image information with respect to a threshold value, for example, conversion of the image information into the two-valued system conducted by regarding one level side of the image information with respect to a single threshold value as "1" and the other level side of the image information as "0". Two or more threshold values may be used. For example the image information may be converted into the three-valued system by using two threshold values.

By "portion surrounded by background portion" is broadly meant the portion which is present inside of the background portion. Thus, it means not only a portion completely surrounded by the background portion but also a portion sandwiched by the background portion and a peripheral portion of the stimulable phosphor sheet or by more background portions.

The aforesaid preliminary read-out image information or image information inside of the irradiation field may be the image information of the whole irradiation field or of a part of the irradiation field. In the latter case, the image information should preferably include at least the image information of the major part of the object.

DESCRIPTION OF THE PREFERRED EMBODIMENTS

The present invention will hereinbelow be described in further detail with reference to the accompanying drawings.

First, an embodiment of the method of the present invention will be described with respect to mammography using a semi-circular irradiation field stop.

Figure 8:
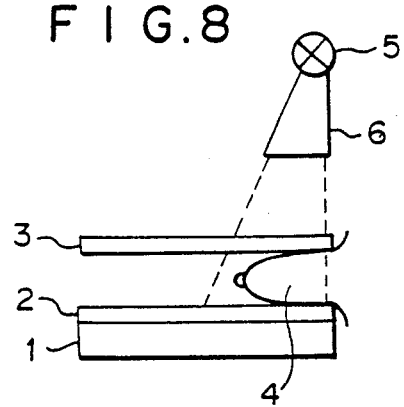
FIG. 8 is a side view showing the condition of mammography using a semi-circular irradiation field stop.

As shown in FIG. 8, in the mammography, a cassette 2 housing a stimulable phosphor sheet is placed on an image recording table 1, and the mamma 4 as an object breast is sandwiched and pressed between the cassette 2 and a holding plate 3 made of an acrylic resin or the like. The object 4 is exposed to radiation emitted by a radiation source 5 positioned above the holding plate 3 and passing through a conical cylinder 6 having a semi-circular cross-section.

Figure 9:
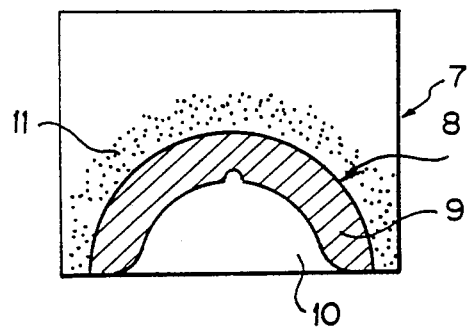
FIG. 9 is a schematic view showing the image information recording condition in the mammography shown in FIG. 8.

FIG. 9 is a plan view showing the image information recording condition on a stimulable phosphor sheet 7 carrying the mamma or breast image recorded as shown in FIG. 8. A semi-circular irradiation field 8 is present on the stimulable phosphor sheet 7. A background portion 9 indicated by hatching is present at the peripheral portion of the irradiation field S, and an object image portion 10 at which the object image information is stored and which is surrounded by the background portion 9 is present inside of the background portion 9. A scattered radiation image portion 11 (indicated by dots) exposed to scattered radiation is present outside of the semi-circular irradiation field 8 constituted by the background portion 9 and the object image portion 10.

Figure 10:
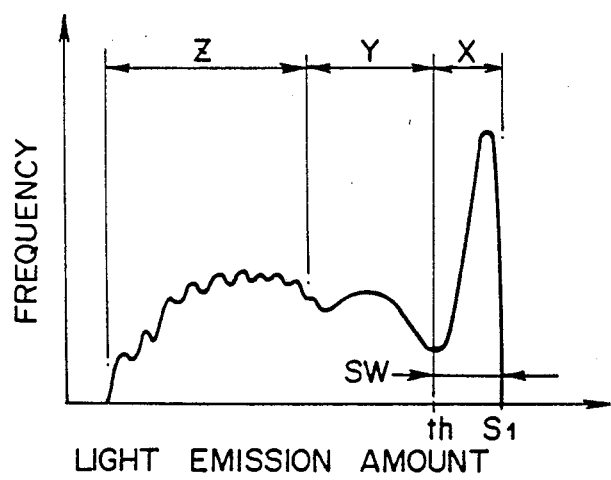
FIG. 10 is a graph showing the histogram of the preliminary read-out image information or image information detected from the stimulable phosphor sheet carrying the mamma image recorded as shown in FIG. 8.

FIG. 10 shows the histogram of the preliminary read-out image information or image information. This information represents the light emission amounts at respective portions of the stimulable phosphor sheet 7 and which is obtained by preliminary read-out or image read-out of the stimulable phosphor sheet 7 carrying the image information stored therein as described above. X denotes the information at the background portion g. Y denotes the information at the object image portion 10, and designates the information at the scattered radiation image portion 11. Since the radiation directly impinges upon the background portion 9 without passing through the object 4, the background image information X is at the region of the maximum light emission amount. At the scattered radiation image portion 11, the level of the radiation energy of the scattered radiation is low. Therefore, the scattered radiation image information Z is at the region of small light emission amount.

Thus, the preliminary read-out image information or image information X at the background portion 9 has a width (distribution) SW caused by nonuniformity in irradiation, sensitivity of the stimulable phosphor sheet, or the like, and occupies the region of the maximum light emission amount amount the whole preliminary read-out image information or image information.

In this embodiment, the information at the background portion is detected by converting the preliminary read-out image information or converting the image information into the two-valued system by use of a threshold value th.

Figure 1:
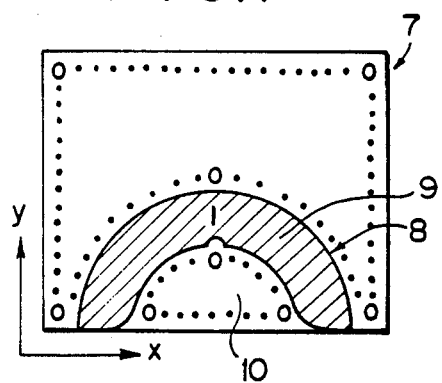
FIG. 1 is a schematic view showing image information stored in a stimulable phosphor sheet and converted into the two-valued system.

Specifically, by converting the preliminary read-out image information or image information by use of the threshold value th (th=S1−SW) at the width SW from the maximum light emission amount S1 in the histogram of the preliminary read-out image information or image information shown in FIG. 10, it is possible to separate the preliminary read-out image information or image information into the information at the background portion and the information at the other portion. Therefore, when the preliminary read-out image information or image information f(x,y) is converted into the two-valued system, for example, as expressed by the formula shown below, and two-valued image information d(x,y) is obtained, the two-valued image information d(x,y) becomes as shown in FIG. 1 and it becomes possible to detect the region of d(x,y)=1 indicated by hatching as the background portion 9.

$$d(x,y) = \begin{array}{l} 0 \text{ if } f(x,y) < th \\ 1 \text{ if } f(x,y) \geq th \end{array}$$

where (x,y) designates the position of the read-out picture element on the stimulable phosphor sheet 7.

The threshold value th is determined by subtracting the predetermined width SW from the maximum light emission amount S1 amount the light emission amounts at respective picture elements. In this embodiment, the threshold value th may be determined by creating the histogram of the preliminary read-out image information or image information as shown in FIG. 10 and calculating from S1 and SW the determined th based on the histogram. Or, the threshold value th may be determined directly based on the shape of the histogram. It is also possible to calculate the threshold value th from S1 obtained from the preliminary read-out image information or image information and SW determined in advance from experimental data or by calculation without creating the histogram.

Then, the preliminary read-out image information or image information inside of the irradiation field constituted by the background portion detected as described above and the object image portion surrounded by the background portion is selected from the whole preliminary read-out image information. Since the background portion is positioned at the peripheral portion of the irradiation field and the object image portion is positioned inside of the background portion by being surrounded thereby, the object image portion surrounded by the background portion can be detected directly from the background portion when the background portion is detected. Or, the object image portion surrounded by the background portion can be detected by combining the background portion with the easily available information on the shape of the irradiation field or the image recording portion of the object. When the background portion is detected in this manner and the object image portion is detected on the basis of the background portion, it becomes possible to recognize the irradiation field constituted by the background portion and the object image portion and to select the image information inside of the recognized irradiation field from the aforesaid preliminary read-out information or image information.

Figure 2:
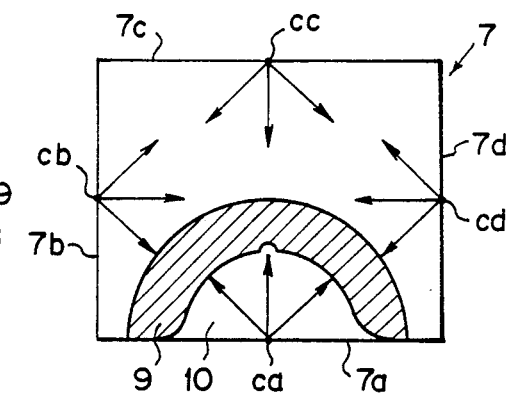
FIG. 2 is a schematic view showing the step of searching a sheet side at which an object image portion is present.

In this embodiment, from the known information on the mammography, the semi-circular irradiation field and the image recording apparatus shown in FIG. 8, it is possible to know that the object image portion 10 is positioned at the center of one side of the stimulable phosphor sheet 7 and surrounded by the arc-shaped background portion 9 and one side of the sheet 7. Therefore, as shown in FIG. 2, presence of the value "1" is first searched from each of center points ca, cb, cc and cd of sheet sides 7a, 7b and 7b towards the other sides (the values at the center points are "0"), i.e., in the directions of 45°, 90° and 135° from each of the center points ca, cb, cc and cd. In this manner, the object image portion 10 is regarded to be present at the side 7a at which the value "1" is detected in all of the three search directions.

Figure 3:
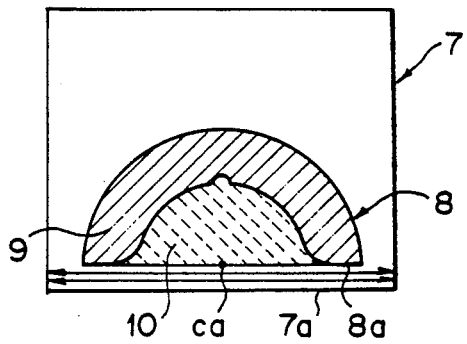
FIG. 3 is a schematic view showing the step of recognizing the object image portion.

Normally the "0" value region surrounded by the side 7a and the background portion may be regarded as the object image portion 10. However, as shown in FIG. 3, there may be the case where a straight line portion 8a of the semi-circular irradiation field 8 is positioned more inward than the sheet side 7a. Therefore, when the sheet side 7a at which the object image portion 10 is recorded is found, the value "1" is searched from the center point ca of the side 7a in the directions at angles of 0° and 180° with respect to the side 7a. Searching is repeated by shifting the searching position by one picture element at a time in the 90° direction until the value "1" is found in the two directions. The region hatched with broken lines and surrounded by the searching line on which the presence of the value "1" is detected in the two directions and the background portion 9 is regarded as the object image portion 10.

Figure 4:
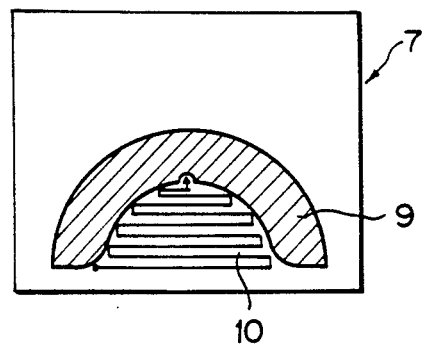
FIG. 4 is a schematic view showing the step of converting the level of the image information of the object image portion from "0" to "1"

After the object image portion 10 is recognized in this manner, the two-valued image information d(x,y)=0 at the object image portion 10 is entirely converted into d(x,y)=1. Specifically, as shown in FIG. 4, the value "0" at all positions inside of the object image portion 10 is converted to the value "1" by scanning the object image portion 10.

In this manner, corrected two-valued image information d (x,y) in which the values of the background portion g and the object image portion 10 are "1" and the values at the other portions are "0" is obtained. By ANDing the corrected two-valued image information d (x,y) with the original preliminary read-out image information or with the original image information f(x,y), i.e., by multiplying the preliminary read-out image information or by multiplying the image information at each picture element by the corrected two-valued image information at the picture element there is obtained new corrected preliminary read-out image information or new corrected image information f'(x,y) in which the value of the region where the corrected two-valued image information was "0" is "0" and the regions of the background portion and the object image portion at which the values were "1" remain equal to the original preliminary read-out image information or the original image information.

That is, by processing as described above, it is possible to select only the preliminary read-out image information or image information within the irradiation field 8 constituted by the background portion 9 and the object image portion 10 from the whole preliminary read-out image information or whole image information.

Any method may be used to select the preliminary read-out image information or image information within the irradiation field insofar as the background portion detected as described above is utilized.

Figure 5:
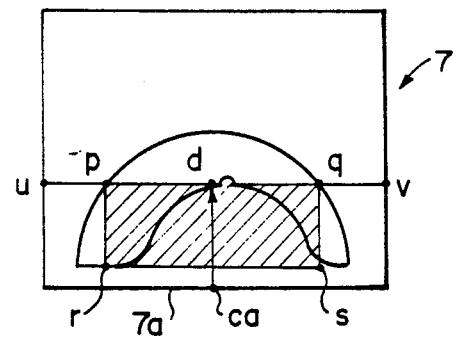
FIG. 5 is a schematic view showing the step of setting the range of the preliminary read-out image information or setting the range of the image information which should be selected inside of the irradiation field.

For example, as shown in FIG. 5, the two-valued image information d(x,y) is searched in the 90° direction from the center point ca of the side 7a of the stimulable phosphor sheet carrying the radiation image stored therein. When the value "1" is found at a point d, searching of the value "1" is conducted from two ends of a line u-v passing through the point d and parallel to the side 7a. Points at which the value "1" is found are taken as p and q, and searching is continued from the points p and q along the lines normal to the side 7a and the line u-v. Points at which the value "0" is found simultaneously along the lines normal to the side 7a are taken as r and s, and the preliminary read-out image information or image information at the region indicated by the hatching and surrounded by the points p, q, r and s is selected.

Thereafter, the read-out conditions in the final read-out are adjusted on the basis of the preliminary read-out image information inside of the irradiation field region selected as described above. Similarly, the image processing conditions are adjusted on the basis of the image information inside of the irradiation field selected as mentioned above.

The read-out conditions may be adjusted in various manners based on the preliminary read-out image information inside of the selected irradiation field region, and the image processing conditions may also be adjusted in various manners based on the image information inside of the selected irradiation field region. For example, a histogram of the preliminary read-out image information or image information is created, Smax and Smin are calculated from the histogram, and the read-out conditions or image processing conditions are adjusted on the basis of Smax and Smin.

The read-out conditions/image processing conditions may be adjusted on the basis of only the selected preliminary read-out image information/selected image information or by considering also the image recording portion of the object such as the head, the chest or the abdomen. and the image recording method such as plain image recording, contrasted image recording, tomography or enlargement image recording.

Another embodiment of the method in accordance with the present invention wherein a image of the limb or the neck is recorded by use of a rectangular irradiation field stop will hereinbelow be described.

Figure 6A:
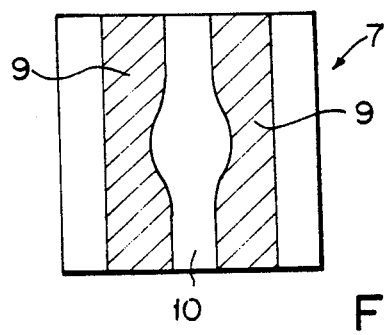
FIGS. 6A, 6B and 6C are schematic views showing the image information recording conditions when the image of the arm is recorded by use of a rectangular irradiation field stop.
Figure 6B:
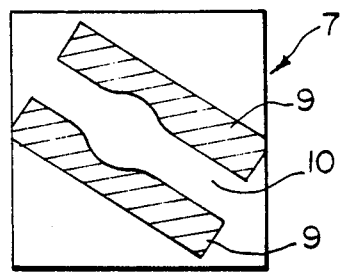
Figure 6C:
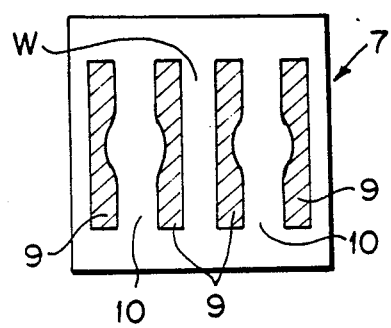

In general, in the case where the image recording is conducted by use of a rectangular irradiation field stop, as shown in FIGS. 6A, 6B and 6C, two band-like background portions 9, 9 indicated by hatching are present, and the object image portion 10 is present sandwiched between the background portions 9, 9. FIG. 6A shows the case where an image of the arm as the image recording portion of the object is recorded on the stimulable phosphor sheet 7 by placing the arm parallel to one side of the sheet 7 and positioning the rectangular irradiation field stop so that the respective sides thereof are parallel to the respective sides of the sheet 7. FIG. 6B shows the case where the arm image is recorded by positioning the arm and the rectangular irradiation field stop obliquely with respect tot he sheet 7. FIG. 6C shows the case of subdivision image recording in which image recording is conducted separately on the right half and the left half of the sheet 7.

In this embodiment, the preliminary read-out image information or image information is first converted into the two-valued system by using a predetermined threshold value th as in the aforesaid embodiment. The conversion into the two-valued system is equivalent to detection of the background portions 9, 9.

Figure 7A:
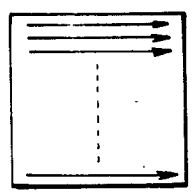
FIGS. 7A, 7B, 7C and 7D are schematic views showing the scan directions for 0-to-1 conversion in the cases of image recording shown in FIGS. 6A, 6B and 6C.
Figure 7B:
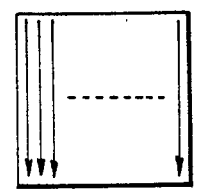
Figure 7C:
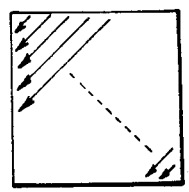
Figure 7D:
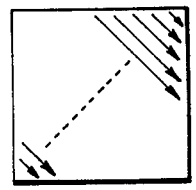

Then as shown in FIG. 7A. the two-valued preliminary read-out image information/two-valued image information is scanned in the main scanning direction in the preliminary read-out/image read-out. and the value "0" present between the value "1" and the value "1" is converted into the value "1". This converting operation is conducted for all of the scanning lines in the sub-scanning direction. Further, as shown in FIGS. 7B, 7C and 7D, the converting operation is conducted at angles of 90°, 45° and 135° with respect to the main scanning direction.

By converting the 0-to-1 conversion in four directions as described above, the information at all or most of the region of the object image portion 10 sandwiched between the background portions 9, 9 is converted from the value "0" to the value "1" in cases of both FIGS. 6A and 6B. In the corrected two-valued image information d'(x,y) obtained by the conversion, the information at the irradiation field region has the value "1", and the other regions have the value "0".

After the corrected two-valued image information d'(x,y) is created in this manner, the preliminary read-out image information or image read-out information only within the irradiation field region is selected by ANDing the information d'(x,y) with the original preliminary read-out image information or original image information f(x,y). On the basis of the selected preliminary read-out image information, the read-out conditions in the final read-out are adjusted or the image processing condition are adjusted.

The aforesaid 0-to-1 conversion is conducted only between an odd-numbered background portion and the subsequent even-numbered background portion where the value "1" appears continuously, and is not conducted between an even-numbered background portion and the subsequent odd-numbered background portion. In this case, in the subdivision image recording as shown in FIG. 6C, only the information at the object image portions 10, 10 is converted, and the information at the portion W which is present between the background portions but is not an object image portion is not converted. In the case of the subdivision image recording, since the object and the irradiation field stop are normally not positioned obliquely with respect to the stimulable phosphor sheet, scanning for the conversion may be conducted only in two directions as shown in FIGS. 7A and 7B. Also, when one side of the object and one side of the irradiation field are parallel to one known side of the stimulable phosphor sheet, scanning for the conversion may be conducted only in the single direction shown in FIG. 7A or 7B. For example, in the case of FIG. 6A, scanning may be carried out only in the single direction shown in FIG. 7A.

What is claimed is:

1. A method of adjusting radiation image readout conditions in which preliminary read-out conducted by exposing a stimulable phosphor sheet carrying a radiation image of an object stored therein by limitation of an irradiation field to stimulating rays of a level lower than the level of stimulating rays used in final read-out and detecting the radiation image stored in the stimulable phosphor sheet is carried out prior to the final readout wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:
subjecting said image information obtained by said preliminary read-out to a threshold value processing to detect a background portion inside of the irradiation field, selecting image information inside of the irradiation field constituted by said background portion and an object image portion surrounded by said background portion from said image information obtained by said preliminary read-out, and adjusting said read-out conditions in said final read-out on the basis of said selected image information, said threshold value processing is a processing for converting said image information obtained by said preliminary read-out into a two-valued system by use of a predetermined threshold value so that the background portion has a first value and the object image portion has a second value which is different from the first value.

2. A method as defined in claim 1, wherein said threshold value processing is conducted by creating a histogram of said image information obtained by said preliminary read-out and using a threshold value determined on the basis of said histogram.

3. A method as defined in claim 1, wherein said object image portion is detected by searching the information obtained by said threshold value processing at least in one direction from a predetermined point on said stimulable phosphor sheet.

4. A method as defined in claim 1, wherein said read-out conditions in said final read-out are adjusted by creating a histogram of said selected image information inside of the irradiation field, calculating the maximum light emission amount and the minimum light emission amount from said histogram, and conducting adjustment based on said maximum light emission amount and said minimum light emission amount.

5. A method of adjusting radiation image read-out conditions in which preliminary read-out conducted by exposing a stimulable phosphor sheet carrying a radiation image of an object stored therein by limitation of an irradiation field to stimulating rays of a level lower than the level of stimulating rays used in final read-out and detecting the radiation image stored in the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary readout.

wherein the improvement comprises the steps of:
subjecting said image information obtained by said preliminary read-out to a threshold value processing to detect a background portion inside of the irradiation field, selecting image information inside of the irradiation field constituted by said background portion and an object image portion surrounded by said background portion from said image information obtained by said preliminary read-out, and adjusting said read-out conditions in said final read-out on the basis of said selected image information wherein said image information inside of the irradiation field is selected by correcting the threshold value-processed image information so that the information at said background portion and the information at said object image portion have a value different from the value at the other portion, and ANDing said corrected, threshold value-processed image information with the original image information obtained by said preliminary read-out.

6. A method of adjusting radiation image processing conditions in which a stimulable phosphor sheet carrying radiation image information of an object stored thereon by limitation of an irradiation field is exposed to stimulating rays which cause the stimulable phosphor sheet to release the radiation image information as light emission in proportion to the stored radiation energy, the light emitted by the stimulable phosphor sheet is photoelectrically detected to obtain electric image signals for use in reproduction of a visible image, and image processing conditions for use in an image processing carried out for the electric image signals are adjusted, wherein the improvement comprises the steps of:
(i) subjecting the obtained image information to a threshold value processing to detect a background portion inside of the irradiation field,
(ii) selecting image information inside of the irradiation field constituted by said background portion and an object image portion surrounded by said background portion from said obtained image information, and
(iii) adjusting said image processing conditions on the basis of said selected image information, said threshold value processing is a processing for converting said obtained image information into a two-valued system by use of a predetermined threshold value so that said background portion has a first value and the object image portion has a second value which is different form the first value.

7. A method as defined in claim 6, wherein said threshold value processing is carried our by creating a histogram of said obtained image information and using a threshold value determined on the basis of said histogram.

8. A method as defined in claim 6, wherein said object image portion is detected by searching the information obtained by said threshold value processing at least in one direction from a predetermined point on said stimulable phosphor sheet.

9. A method as defined in claim 6, wherein said image processing conditions are adjusted by creating a histogram of said selected image information inside of the irradiation field, calculating the maximum light emission amount and the minimum light emission amount from said histogram, and carrying out adjustment based on said maximum light emission amount and said minimum light emission amount.

10. A method of adjusting radiation image processing conditions in which a stimulable phosphor sheet carrying radiation image information of an object stored thereon by limitation of an irradiation field is exposed to stimulating rays which cause the stimulable phosphor sheet to release the radiation image information as light emission in proportion to the stored radiation energy, the light emitted by the stimulable phosphor sheet is photoelectrically detected to obtain electric image signals for use in reproduction of a visible image, and image processing conditions for use in an image processing carried out for the electric image signals are adjusted, wherein the improvement comprises the steps of:
(i) subjecting the obtained image information to a threshold value processing to detect a background portion inside of the irradiation field,
(ii) selecting image information inside of the irradiation field constituted by said background portion and an object image portion surrounded by said background portion from said obtained image information, and
(iii) adjusting said image processing conditions on the basis of said selected image information,
wherein said image information inside of the irradiation field is selected by correcting the threshold value-processed image information so that the information at said background portion and the information at said object image portion have a value different from the value at the other portion, and ANDing said corrected, threshold value-processed image information with the original obtained image information.

* * * * *